(12) United States Patent
Stein et al.

(10) Patent No.: US 7,000,090 B2
(45) Date of Patent: Feb. 14, 2006

(54) CENTER FOCUSED SINGLE INSTRUCTION MULTIPLE DATA (SIMD) ARRAY SYSTEM

(75) Inventors: Yosef Stein, Sharon, MA (US); Joshua A. Kablotsky, Sharon, MA (US)

(73) Assignee: Analog Devices, Inc., Norwood, MA (US)

( * ) Notice: Subject to any disclaimer, the term of this patent is extended or adjusted under 35 U.S.C. 154(b) by 509 days.

(21) Appl. No.: 10/159,763

(22) Filed: May 30, 2002

(65) Prior Publication Data

US 2003/0140213 A1 Jul. 24, 2003

Related U.S. Application Data

(60) Provisional application No. 60/350,398, filed on Jan. 21, 2002.

(51) Int. Cl.
*G06F 15/80* (2006.01)
*G06F 17/50* (2006.01)

(52) U.S. Cl. ............................ 712/22; 712/13; 712/18; 712/225; 716/7; 716/17

(58) Field of Classification Search ................ 712/13, 712/18, 22, 225, 14, 15; 716/7, 17; 709/238
See application file for complete search history.

(56) References Cited

U.S. PATENT DOCUMENTS

| | | |
|---|---|---|
| 3,303,477 A | 2/1967 | Voigt |
| 3,805,037 A | 4/1974 | Ellison |
| 4,722,050 A | 1/1988 | Lee et al. |
| 4,847,801 A | 7/1989 | Tong |
| 4,852,098 A | 7/1989 | Brechard et al. |
| 4,855,903 A * | 8/1989 | Carleton et al. ............ 709/248 |
| 4,918,638 A | 4/1990 | Matsumoto et al. |
| 5,095,525 A | 3/1992 | Almgren et al. |

(Continued)

FOREIGN PATENT DOCUMENTS

EP 1 246 389 A1 10/2002

OTHER PUBLICATIONS

Viktor Fischer, *Realization of the Round 2 AES Candidates Using Altera FPGA*, (Jan. 26, 2001) <esre.nist.gov/Crypto-Toolkit/aes/roun2/conf3/papers/24–vfischer.pdf> (Micronic—Kosice, Slovakia).
Máire McLoone and J.V. McCanny, *High Performance Single–Chip FPGA Rijndael Algorithm Implementations*, CHES 2001 Proc, LNCS 2162, 65–76 (C.K. Koc et al. eds. May 16, 2001).
Elixent, *Changing the Electronic Landscape* (2001) <www.elixent.com> (elixent—Bristol, UK).
Elixent Application Note *JPEG Codec* (Dec. 9, 2002) <www.elixent.com/assets/jpeg–coder.pdf> (elixent—Bristol, UK).
U.S. Appl. No. 10/440,330, filed May 16, 2003, Stein et al.
U.S. Appl. No. 10/395,620, filed Mar. 24, 2003, Stein et al.
V. Baumgarte et al., *PACT XPP—A Self–Reconfigurable Data Processing Architecture* (Jun. 2001) <www.pactcorp.com/xneu/download/ersa01.pdf> (PACT XPP—Santa Clara, CA).
PACT Informationstechnologie GmbH, *The XPP White Paper Release 2.1* (Mar. 27, 2002) <www.pactcorp.com/xneu/download/xpp_white_paper.pdf> (PACT XPP—Santa Clara, CA).

*Primary Examiner*—Daniel H. Pan
(74) *Attorney, Agent, or Firm*—Iandiorio & Teska

(57) ABSTRACT

A center focussed SIMD array system including an SIMD array including a plurality of processing elements arranged in a number of columns and rows and having two mutually perpendicular axes of symmetry defining four quadrants; and a sequencer circuit for moving the data in each element to the next adjacent element towards one axis of symmetry until the data is in the elements along the one axis of symmetry and then moving the data in the elements along the the one axis of symmetry to the next adjacent element towards the other axis of symmetry until the data is at the four central elements at the origin of the axes of symmetry.

7 Claims, 6 Drawing Sheets

U.S. PATENT DOCUMENTS

| | | |
|---|---|---|
| 5,182,746 A | 1/1993 | Hurlbut et al. |
| 5,214,763 A | 5/1993 | Blaner et al. |
| 5,379,243 A | 1/1995 | Greenberger et al. |
| 5,386,523 A | 1/1995 | Crook et al. |
| 5,446,850 A | 8/1995 | Jeremiah et al. |
| 5,577,262 A | 11/1996 | Pechanek et al. |
| 5,689,452 A | 11/1997 | Cameron |
| 5,708,836 A | 1/1998 | Wilkinson et al. |
| 5,742,180 A * | 4/1998 | DeHon et al. ............... 326/40 |
| 5,752,068 A | 5/1998 | Gilbert |
| 5,832,290 A | 11/1998 | Gostin et al. |
| 5,859,981 A * | 1/1999 | Levin et al. ............... 709/238 |
| 5,872,988 A | 2/1999 | Duranton |
| 5,937,202 A * | 8/1999 | Crosetto ............... 712/19 |
| 5,996,057 A | 11/1999 | Scales, III et al. |
| 6,049,815 A | 4/2000 | Lambert et al. |
| 6,067,609 A * | 5/2000 | Meeker et al. ............... 712/11 |
| 6,199,086 B1 | 3/2001 | Dworkin et al. |
| 6,199,087 B1 | 3/2001 | Blake et al. |
| 6,223,320 B1 | 4/2001 | Dubey et al. |
| 6,230,179 B1 | 5/2001 | Dworkin et al. |
| 6,246,768 B1 | 6/2001 | Kim |
| 6,317,819 B1 | 11/2001 | Morton |
| 6,349,318 B1 | 2/2002 | Vanstone et al. |
| 6,434,662 B1 | 8/2002 | Greene et al. |
| 6,581,152 B1 | 6/2003 | Barry et al. |
| 6,587,864 B1 | 7/2003 | Stein et al. |
| 2002/0041685 A1 | 4/2002 | McLoone et al. |
| 2002/0147825 A1 | 10/2002 | Stein et al. |
| 2002/0174318 A1 | 11/2002 | Stuttard et al. |
| 2003/0103626 A1 | 6/2003 | Stein et al. |
| 2003/0105791 A1 | 6/2003 | Stein et al. |
| 2003/0110196 A1 | 6/2003 | Stein et al. |
| 2003/0115234 A1 | 6/2003 | Stein et al. |
| 2003/0133568 A1 | 7/2003 | Stein et al. |
| 2003/0140211 A1 | 7/2003 | Stein et al. |
| 2003/0140212 A1 | 7/2003 | Stein et al. |
| 2003/0149857 A1 | 8/2003 | Stein et al. |

* cited by examiner

CENTER FOCUSED SINGLE INSTRUCTION MULTIPLE DATA (SIMD) ARRAY SYSTEM

RELATED APPLICATIONS

This application claims priority based on U.S. Provisional application Ser. No. 60/350,398, filed Jan. 21, 2002, U.S. patent application Ser. No. 10/090,941 filed Mar. 5, 2002, and U.S. patent application Ser. No. 10/141,567, entitled RECONFIGURABLE SINGLE INSTRUCTION MULTIPLE DATA ARRAY to Stein et al., filed May 8, 2002, now U.S. Pat. No. 6,865,661.

FIELD OF THE INVENTION

This invention relates to a center focused single instruction multiple data (SIMD) array system.

BACKGROUND OF THE INVENTION

Conventional SIMD arrays having a plurality of processing cells or elements (PEs) utilize a number of different approaches to move data among the elements to effect a variety of signal processing algorithms that need to make a global decision based on decisions made locally in each of the processing elements e.g., motion estimation-finding the best matching block (minimum-using the Sum of Absolute Difference (SAD) criteria) between all local candidates in a given search area, RAKE receiver-finger (each RAKE finger computes the correlation between the despreaded received code samples and the reference scrambling code samples) with the maximum correlation, maximum, minimum, and global thresholding. In one approach each element is connected to each of its neighboring elements in all four directions. This allows data to be moved in any direction and can culminate the processing at any element but requires significant power, bus structure, area, and cycle time to complete operations. One attempt to reduce the bus structures uses a unidirectional interconnection e.g. all PEs send left and receive right-or, send from up to down at any given cycle so that only half of the PE-to-PE interfaces are utilized at a time. In operation, for example, the data can be moved in each row, all the way to the right-most elements, then moved down that column of elements to a single element in the lower right corner. However, each row and column has an end around connection so that the bank of data can be moved so as to culminate at any particular focus, e.g., lower right, upper left this approach also supports a folded array in which the array of rows and columns of elements are folded over on a diagonal of the array permitting all of the elements, except those along the diagonal, to be combined in dual clusters thereby reducing by half the bus structures and overall area. All of these approaches require a large number of cycles, approximately the sum of the number of columns and rows, to complete the data movement. See the Elixent reconfigurable ALU array (RAA) at www.elixent.com. See also the XPP architecture at www.PACTCORP.com.

BRIEF SUMMARY OF THE INVENTION

It is therefore an object of this invention to provide an improved center focussed single instruction multiple data (SIMD) array system.

It is a further object of this invention to provide such an improved cluster focussed single instruction multiple data (SIMD) array system which is smaller, requires less power, less space and less bus interconnection.

It is a further object of this invention to provide such an improved cluster focussed single instruction multiple data (SIMD) array system which can be folded not only once but twice to further reduce space, and bus interconnects.

It is a further object of this invention to provide such an improved cluster focussed single instruction multiple data (SIMD) array system which completes operations in nearly half the number of cycles.

It is a further object of this invention to provide such an improved cluster focussed single instruction multiple data (SIMD) array system which requires fewer instructions to carry out the operations.

The invention results from the realization that a simpler, smaller, faster SIMD array system can be effected with a plurality of processing elements arranged in rows and columns and having two mutually perpendicular axes of symmetry defining four quadrants by center focussing the completion of the operations using a sequencer circuit which moves the data in each element to the next adjacent element towards one axis of symmetry until the data is in the elements along said one axis of symmetry and then moving the data in said elements along the said one axis of symmetry to the next adjacent element towards the other axis of symmetry until the data is at the four central elements at the origin of said axes of symmetry.

This invention features a center focussed SIMD array system including an SIMD array having a plurality of processing elements arranged in a number of columns and rows and having two mutually perpendicular axes of symmetry defining four quadrants. There is a sequencer circuit for moving the data in each element to the next adjacent element towards one axis of symmetry until the data is in the elements along the one axis of symmetry and then moving the data in the elements along the one axis of symmetry to the next adjacent element towards the other axis of symmetry until the data is at the four central elements at the origin of the axes of symmetry.

In the preferred embodiment the four quadrants may include an equal number of the elements. The sequencer circuit may move the data from two of the central elements across a line of symmetry to the other two central elements. The sequencer circuit may move the data from one of the other two central elements to the other of the other two central elements. The array may be folded about one of the axes of symmetry and the elements may be combined in dual-element clusters with common bus interconnections. The array may be folded about both of the axes of symmetry and the elements may be combined in quad-element clusters with common bus interconnections. There may be an even number of one of the rows and columns. There may be an even number of the rows and columns.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
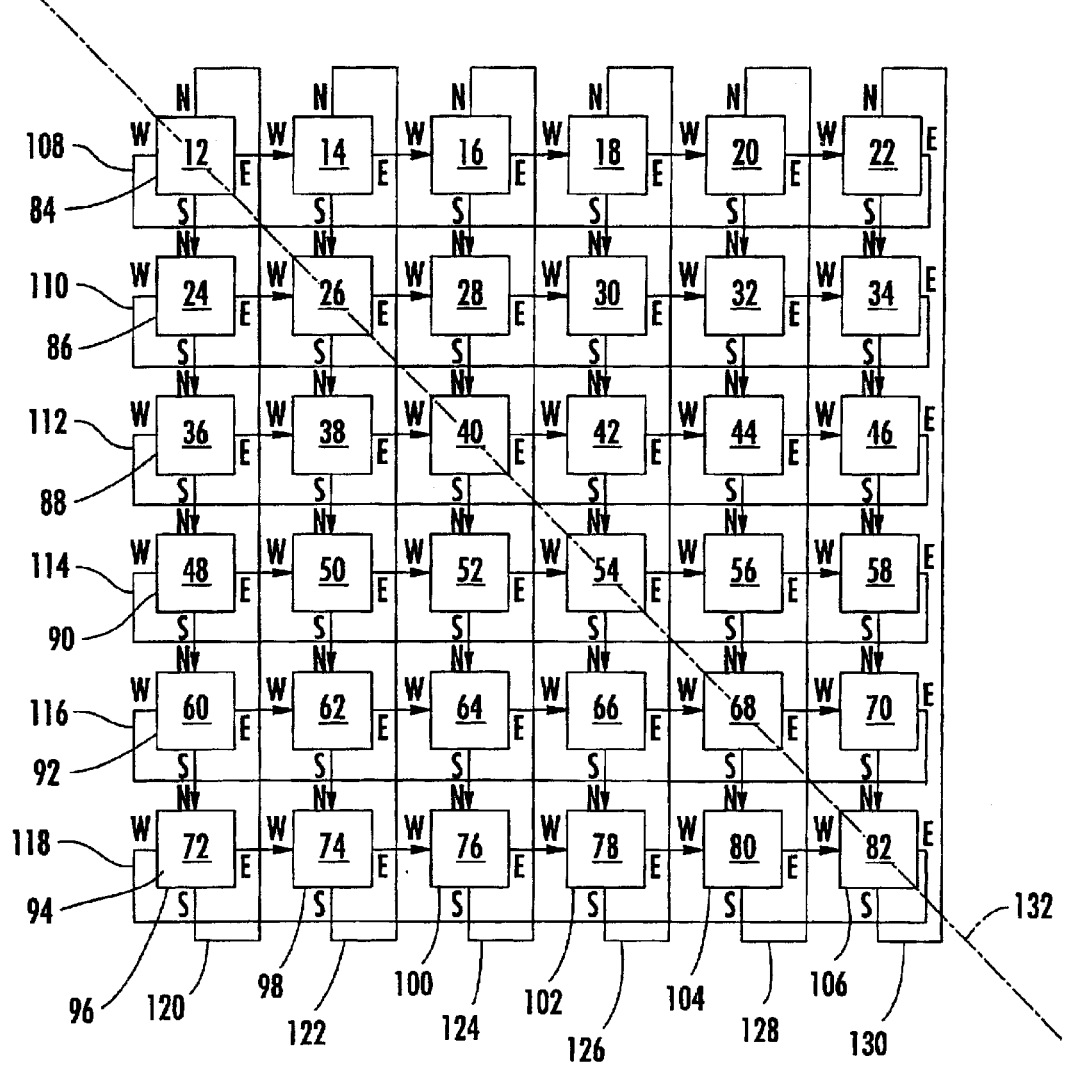
FIG. 1 is a simplified schematic diagram of a prior art SIMD array.

There is shown in FIG. 1 a unidirectional prior art single instruction multiple data array 10 including thirty-six cells 12–82 arranged in six rows 84–94 and six columns. Array 10 is known as a unidirectional array because each of the cells in each of the columns 96–106 moves data in one direction only from the left toward the right and each of the cells in each of the rows 84–94 moves the data in only one direction from up to down. In its simplest operation all of the data might, for example, be transferred from left to right starting with the cells in column 96 until the data arrives at the cells in column 106. Then the data in each of the cells in column 106 is shifted down until the final result resides in the single cell 82 at the bottom of column 106. Thus the completion is focused at the lower right corner, cell 82, where row 94 and column 106 intersect. The presence of the end around loops 108–118 associated with each row 84–94 and end around loops 120–130 associated with each column 96–106, respectively, enables the completion point to be focused at any particular location.

Figure 2:
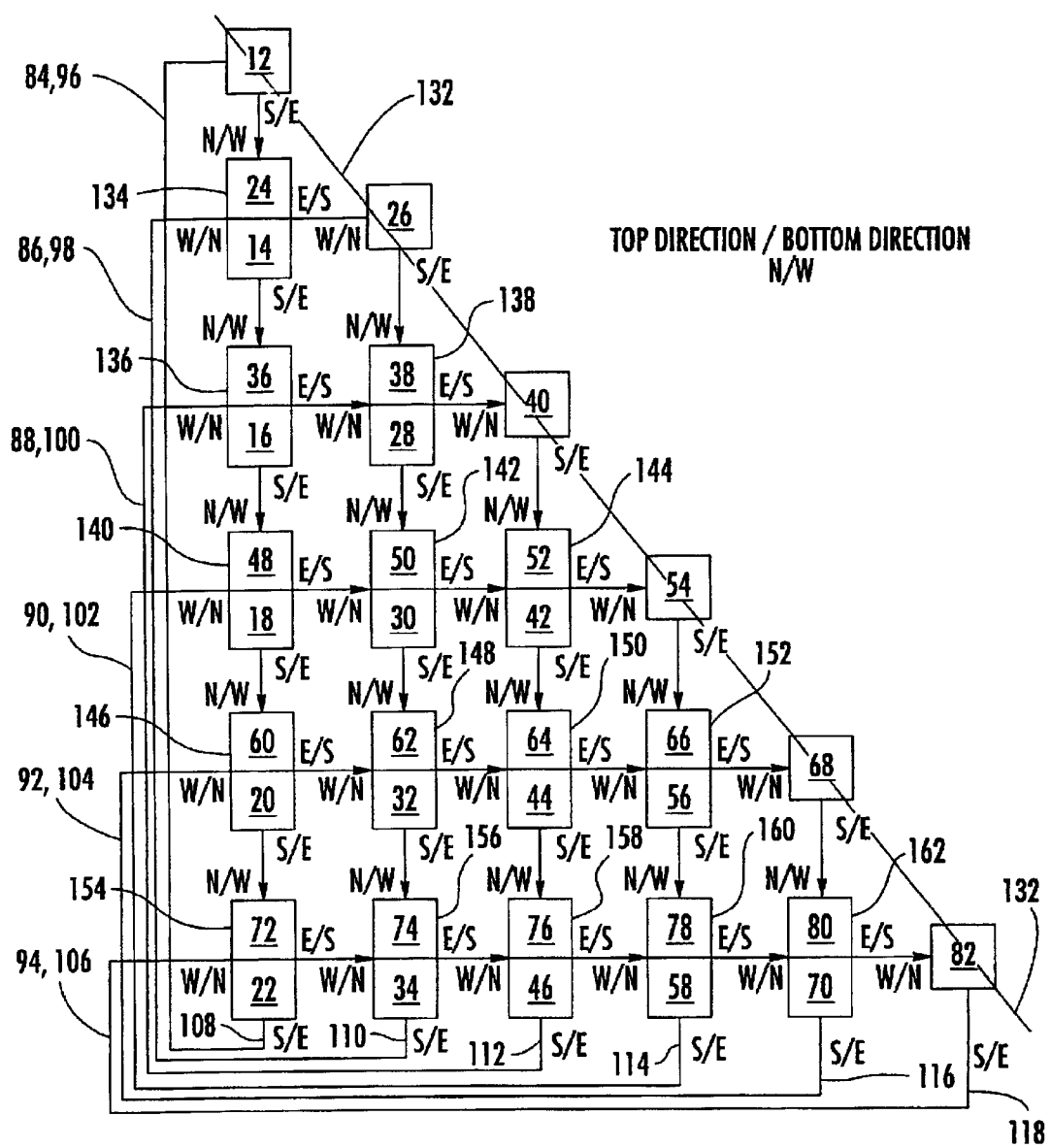
FIG. 2 is a view of the array of FIG. 1 folded on a diagonal of the array with dual clusters of processing elements.

In order to achieve certain economies in space and bus structure, prior art array 10, FIG. 1 has been folded along a diagonal axis as shown in FIG. 2 where this preserves the unidirectionality of array 10a, FIG. 2 and combines all of the processing elements so that counterpart elements form dual clusters 134–162 with the exception of those elements 12, 26, 40, 54,68, 82 along the diagonal 132 which remain single.

While this approach does reduce by half the bus structure and the area, it still requires a substantial number of cycles, 2n−1, to complete the operation, where n is the number of processing elements in a row and a column. For example, in the device of FIG. 1 where the matrix has six rows and six columns the number of cycles to complete operation is 2×6=12−1 or 11.

Figure 3:
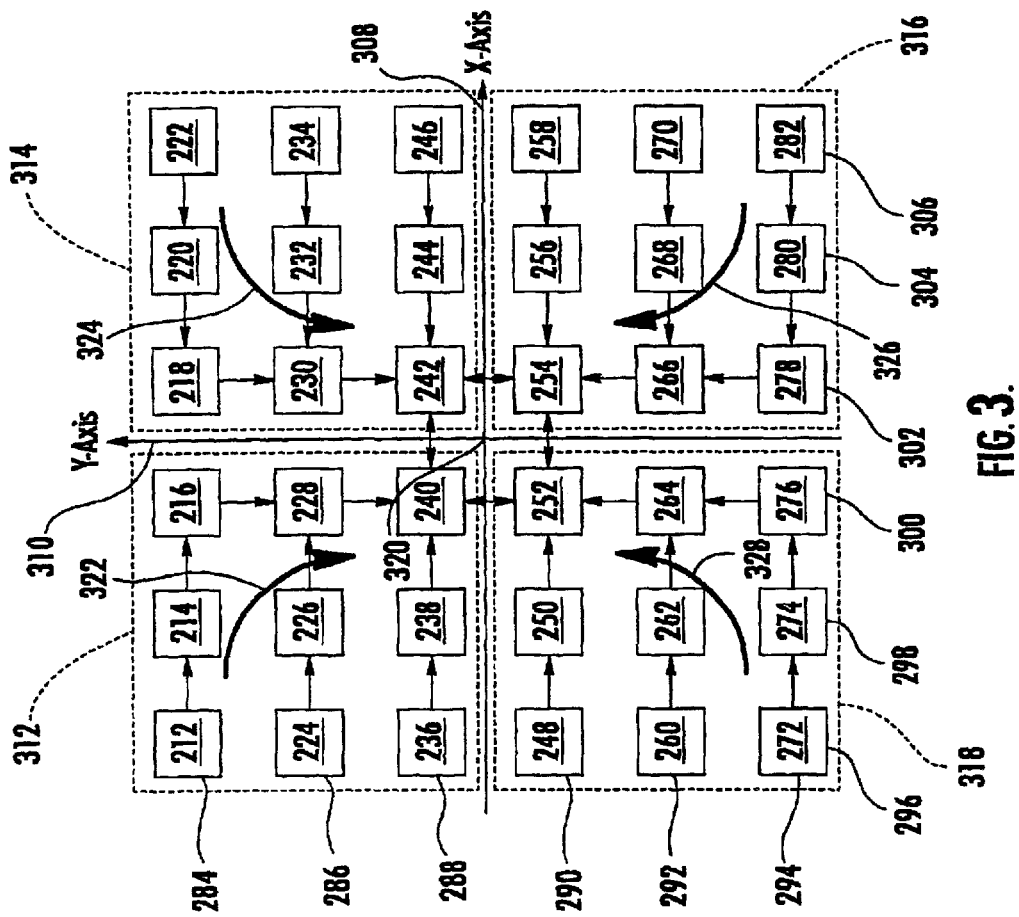
FIG. 3 is a simplified schematic diagram of a center focussed SIMD array system according to this invention.

In accordance with this invention, array 200, FIG. 3 also is shown to include for convenience of understanding and comparison thirty-six cells 212–282 arranged in six rows 284–294 and six columns 296–306. However, SIMD array 200 is a center focused array in which the movement of the data culminates at the center of the array. The array is symmetrical around two axes of symmetry, the x axis of symmetry 308 and the y axis of symmetry 310 which divides array 200 into four quadrants, 312, 314, 316, and 318. The data in each of the quadrants is moved in steps toward the center or origin 320 where the two axes of symmetry 308, 310 intersect. For example, with respect to quadrant 314, elements 222, 234, and 246 are instructed to move their data in a first direction to the left toward axis of symmetry 310 to their adjacent elements 220, 232 and 244 which are again instructed to move the data in the same direction, to the left, to adjacent elements 218, 230, and 242. This continues until the data reaches the cells which are adjacent the axis of symmetry, for example, in this case axis 310. The data is then moved from cell to adjacent cell along the same axis 310 so that the data is now instructed to be moved from element 218 to element 230 and then to element 242. This occurs simultaneously in the other three quadrants so that after four cycles of operation the data from the four quadrants 312, 314, 316, and 318 end up in elements 240, 242, 254, and 252. In the fifth cycle of operation the data may be moved from elements 242 and 254 across the axis of symmetry 310 to elements 240 and 252. In the next and last cycle of operation the data may be moved from element 240 to element 252. For purposes of symmetry there will be an even number of either the rows or columns or both.

The arrows 322, 324, 326, and 328 indicate the general direction of the data flow in conformance with this example. However, this is not a necessary limitation of the invention. For example the first two cycles of operation can move the data toward axis 308 and the third and fourth could move it along axis 308 with the same result. Also, it should be understood that although the array is shown as a 6×6 element array, this is not a necessary limitation of the invention. This is for convenience of explanation only. The result with this center focused approach, according to this invention is that the number of cycles of operation is cut nearly in half. For any given array the number of operations to get it to completion is equal to the number of rows or columns in a square array. In this case where the array is once again a 6 row×6 column array, it takes only six cycles of operation to complete the operation as compared with the prior art device shown in FIGS. 1 and 2 of the same size which took eleven cycles of operation. The particular calculation being done can be any of a number of simple or complex computations including seeking across all the PEs for the global minimum, global maximum, PEs region threshold, PEs average, or motion estimation.

Figure 4:
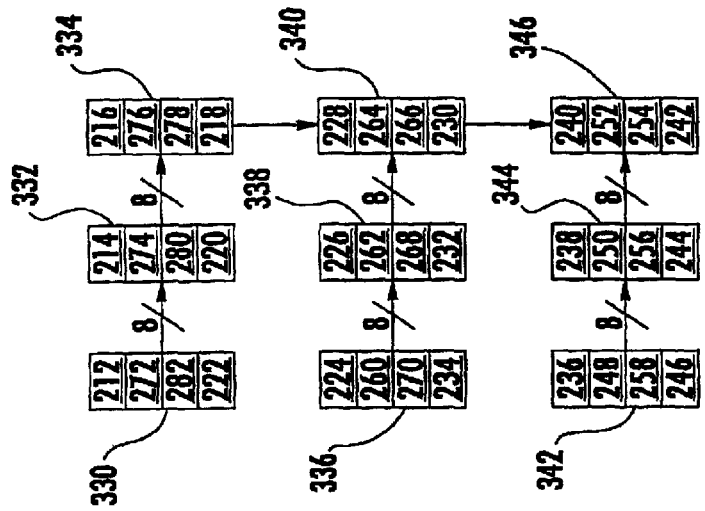
FIG. 4 is a view of the array system of FIG. 3 after it has been folded according to this invention.

An added advantage of the doubly symmetrical center focused array 200 according to this invention is that is can be folded not just once, although it works well in that configuration, but twice, so that all four quadrants lay atop one another and form quadruple clusters as shown in FIG. 4 where the thirty-six processing elements 212–282 are combined into nine quad clusters 330–346, FIG. 4, each of which contains four elements. Not only is the area required reduced by a factor of four, but the cable interconnections can be reduced as well so that the bus structure is dramatically reduced. Or, in the alternative, the bus structure could be maintained and the speed of operation increased. For example, the reduced bus structure of eight lines each as shown in FIG. 4, could be increased to thirty-two to thereby increase the speed by a factor of four while introducing the added cable structure.

Figure 5:
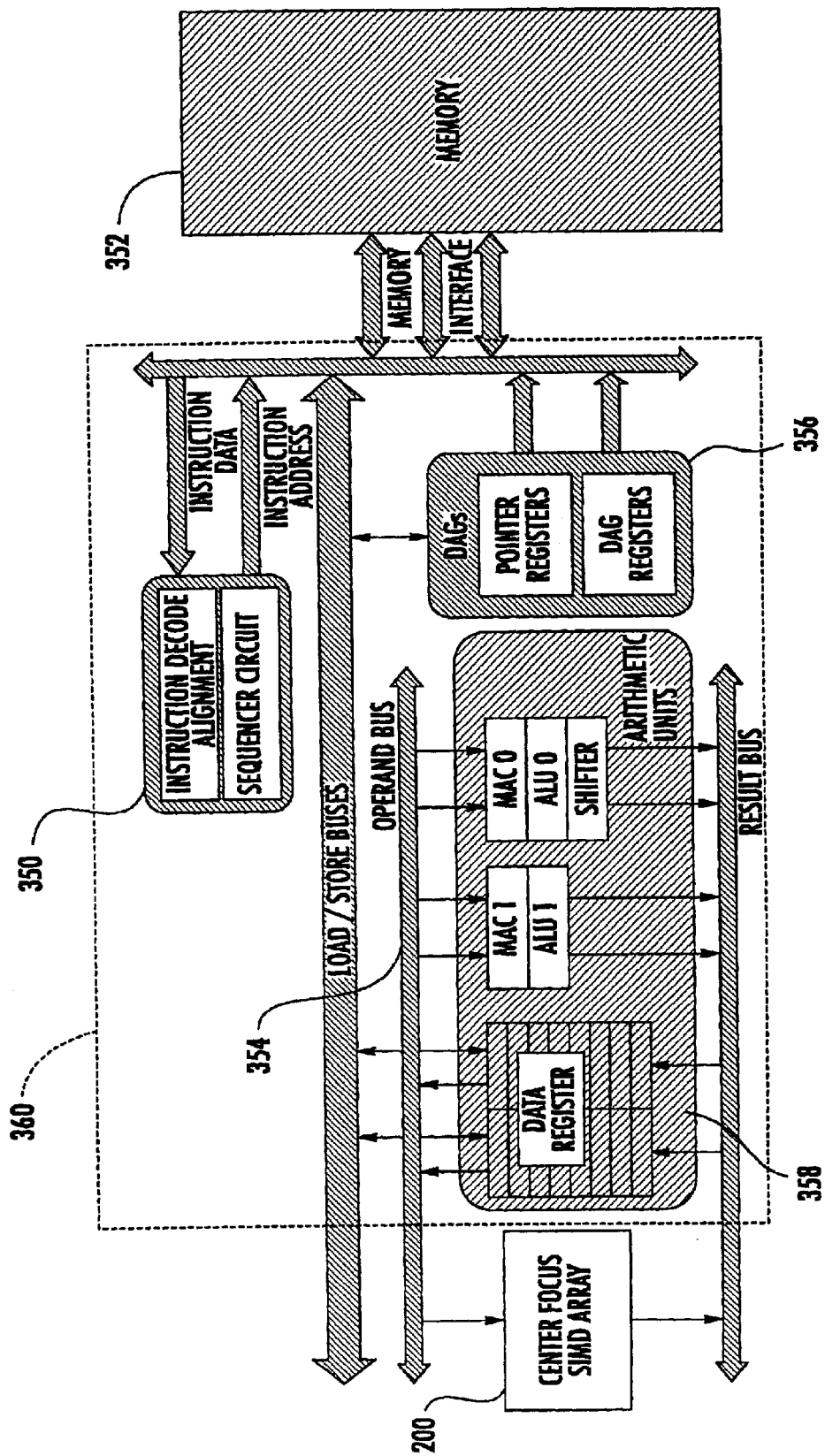
FIG. 5 is a simplified schematic diagram of a digital signal processor (DSP) including an SIMD center focus array and controller current according to this invention.
Figure 6:
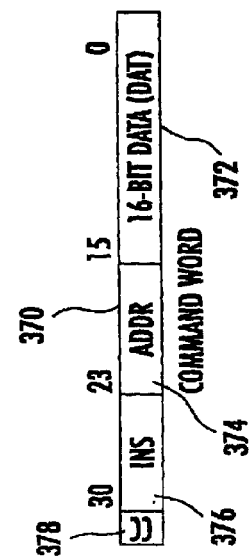
FIG. 6 is a simplified diagrammatic view of a command word used by the system of this invention.
Figure 8:
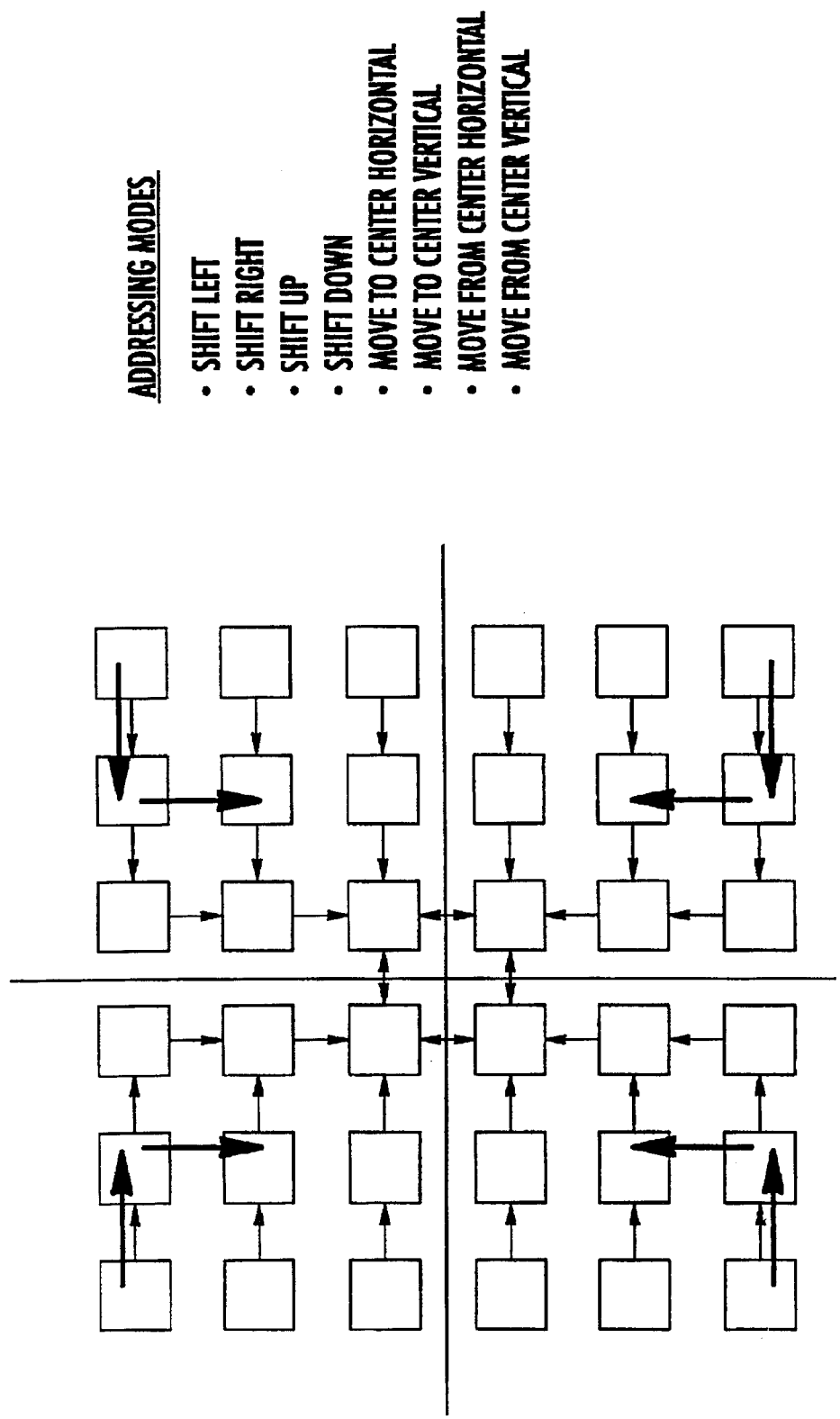
FIG. 8 is simplified schematic diagram of the array system of FIG. 3 that shows the addressing modes.

The center focused movement of the data is accomplished by a sequencer circuit 350, FIG. 5 which extracts the necessary instructions from memory 352 and delivers it over the network bus 354 to SIMD array 200, FIG. 5. Sequencer circuit 350, memory 352, the bus structure 354, as well as the DAGs 356, and arithmetic units 358 may all form a portion of digital signal processor 360. The command word 370, FIG. 6 that controller circuit 350 may use to affect the center focused processing of the data in the array may include a data field 372, address field 374, and instruction field 376 as well as a condition code 378. The only part here pertinent is the instruction portion 376 which can contain the instruction shift left, shift right, shift up, shift down, move to center horizontal, move to center vertical, move from center horizontal, or move from center vertical.

Figure 7:
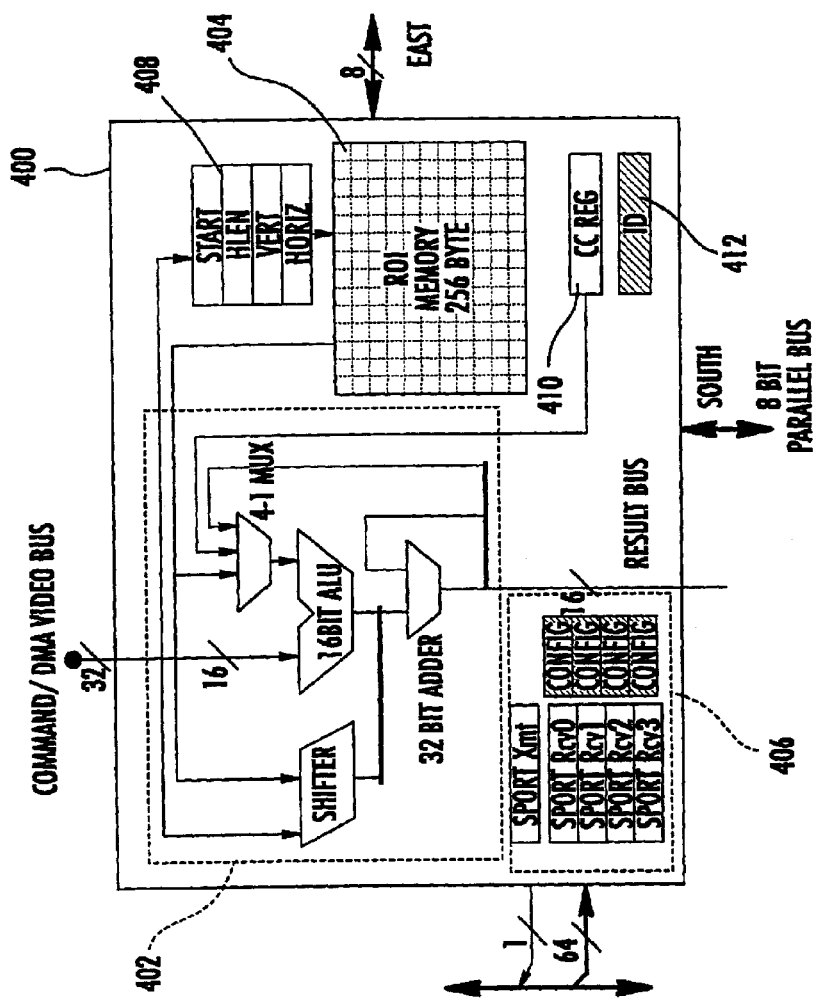
FIG. 7 is a simplified schematic diagram of one example of a processor element that can be used in the center focussed SIMD array system of this invention.

Each of the processing elements in the array may be as simple as a simple arithmetic unit or may include more complex arithmetic units, registers, and memory, up to and including a complexity that essentially implements an entire digital signal processor. One particular example of a cell 400, FIG. 7 includes arithmetic logic unit 402, memory 404, I/O circuit 406, a direct memory access circuit 408, condition code register 410, and identification number register 412. Further explanation of such a cell and the command word 370 occurs in U.S. patent application Ser. No. 10/090,941 filed Mar. 5, 2002 and U.S. patent application entitled RECONFIGURABLE SINGLE INSTRUCTION MULTIPLE DATA ARRAY to Stein et al., filed May 8, 2002, incorporated herein by this reference in their entirety.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A center focussed SIMD array system comprising:
   an SIMD array including a plurality of processing elements arranged in a number of columns and rows and having two mutually perpendicular axes of symmetry defining four quadrants; and
   a sequencer circuit for moving the data in each element to the next adjacent element towards one axis of symmetry until the data is in the elements along said one axis of symmetry and then moving the data in said elements along the said one axis of symmetry to the next adjacent element towards the other axis of symmetry until the data is at the four central elements at the origin of said axes of symmetry.

2. The center focussed SIMD array system of claim 1 in which said four quadrants include an equal number of said elements.

3. The center focussed SIMD array system of claim 1 in which said sequencer circuit moves the data from two of the central elements across a line of symmetry to the other two central elements.

4. The center focussed SIMD array system of claim 3 in which said sequencer circuit moves the data from one of said other two central elements to the other of said other two central elements.

5. The center focussed SIMD array system of claim 1 in which said array is folded about one of said axes of symmetry and said elements are combined in dual-element clusters with common bus interconnections.

6. The center focussed SIMD array system of claim 1 in which said array is folded about both of said axes of symmetry and said elements are combined in quad-element clusters with common bus interconnections.

7. The center focussed SIMD array system of claim 1 in which there are an even number of at least one of said rows and said columns.

\* \* \* \* \*